United States Patent [19]

Korthals

[11] 4,009,687
[45] Mar. 1, 1977

[54] ROUGHAGE FEEDER UNIT

[76] Inventor: John G. Korthals, R.R. 1, George, Iowa 51237

[22] Filed: Sept. 8, 1975

[21] Appl. No.: 610,932

[52] U.S. Cl. ............................ 119/51 R; 119/60
[51] Int. Cl.² ................................... A01K 5/00
[58] Field of Search ............. 119/51 R, 58, 60, 54, 119/16, 20; 280/8

[56] References Cited

UNITED STATES PATENTS

| | | | |
|---|---|---|---|
| 284,091 | 8/1883 | Tolbert | 119/60 |
| 479,680 | 7/1892 | Thompson | 119/60 X |
| 2,491,577 | 12/1949 | Olinger | 119/60 |
| 2,815,001 | 12/1957 | Hanson | 119/58 |
| 2,843,085 | 7/1958 | McKee | 119/16 |
| 3,030,920 | 4/1962 | Hibbert | 119/60 |
| 3,063,416 | 11/1962 | Elstner | 119/58 X |
| 3,336,908 | 8/1967 | Swanson | 119/60 |
| 3,443,708 | 5/1969 | Blair | 280/8 |
| 3,620,192 | 11/1971 | Taylor et al. | 119/60 X |
| 3,738,327 | 6/1973 | Stirling | 119/51 R |

FOREIGN PATENTS OR APPLICATIONS 236,515  7/1959  Australia ............... 119/58

*Primary Examiner*—J.N. Eskovitz
*Attorney, Agent, or Firm*—Charles P. Boukus, Jr.

[57] ABSTRACT

A roughage feeder unit for cattle or livestock comprises an upright gate assembly mounted on supports at opposite ends of the assembly and provided with ground engaging wheels and skids to support the gate assembly for movement over the ground. The unit includes a device coupled to the gate assembly for anchoring the gate assembly to the ground and adapted to restrict the gate assembly to movement over a predetermined distance relative to the ground. A preferred embodiment of the anchoring device comprises a telescoping brace adapted to be secured to the ground by a stake and provided with a stop to limit the movement of the gate assembly relative to the stake.

14 Claims, 8 Drawing Figures

ROUGHAGE FEEDER UNIT

The present invention relates to a roughage feeder unit for cattle or livestock and, more particularly, to a feeder unit which can be readily moved over the ground and anchored adjacent to roughage, such as a haystack or large bales of hay, to allow cattle and livestock to feed on a limited portion of the haystack.

In the prior art, various arrangements have been proposed to feed roughage to cattle and other livestock. For example, stationary fence-like enclosures have been used to receive hay or other roughage for feeding to livestock. Such enclosures have been relatively heavy and difficult to transport and install. Thus, it has been frequently necessary to leave the enclosure in a fixed location and transport the hay or other roughage to the enclosure, sometimes from considerable distances away. In addition, since the fence-like enclosure has been stationary, the roughage within the enclosure must be frequently moved outward toward the periphery of the enclosure to permit the cattle or livestock to reach the roughage.

To avoid the necessity of further handling of the roughage after it is placed within the feeding enclosure, it has been proposed to design the fence-like enclosure to be collapsible inwardly in response to pressure exerted against the enclosure by the cattle or livestock. This type of enclosure has also been generally heavy and difficult to move about. Consequently, it has also been necessary to transport the roughage to this type of enclosure.

Another type of feeder unit which has been proposed consists of a slidable gate unit. The unit includes an upright, ladder-like gate element to provide a plurality of feeding stations for cattle mounted on side supports including horizontal skids intended to slide over the ground in response to pressure against the gate by cattle. Such units have been generally heavy and difficult to maneuver, particularly in inclement weather. Oftentimes it has been necessary to employ a tractor to move the gate units to desired locations. In addition, because of the substantial contact area between the skids and the ground, it has been difficult for cattle or livestock to move the units. The pressure exerted against the unit by cattle or livestock tends to drive the front ends of the skids into the ground to further increase the resistance to movement of the units. At the same time, the rear ends of the skids tend to raise up slightly off the ground. Further, in cold weather, when the ground is likely to thaw in the daytime and freeze at night, such units have been likely to freeze to the ground.

In addition, no provision has been made to limit movement of the slidable gate units of the prior art in response to pressure by cattle or livestock. Accordingly, it has been possible for the cattle or livestock to move the gate so close to the roughage that the animals have a tendency to pull the roughage through the gate and waste a substantial amount by trampling it underfoot. The lack of any restraint on movement of the slidable gate unit has also permitted the animals to consume far more roughage than is necessary. The above disadvantages have discouraged previous use of a slidable gate unit to control feed of roughage to cattle or livestock.

An objective of the present invention is to provide a roughage feeder unit for cattle or livestock consisting of an upright gate-like assembly which is readily movable over the ground. It is also an objective of the invention to provide a gate-like roughage feeder unit which can be anchored to the ground to restrict the gate unit to movement over a predetermined distance relative to the ground.

In accordance with the present invention, a roughage feeder unit comprises an upright gate assembly provided with ground engaging means supporting the gate assembly for movement over the ground, the ground engaging means comprising a pair of wheels mounted forwardly at spaced locations on the gate assembly to permit the gate assembly to move forward over the ground in response to pressure by the livestock against the gate assembly. Preferably, the ground engaging means includes a pair of skids mounted rearwardly at spaced locations on the gate assembly and adapted to slide over the ground in response to pressure by the livestock against the gate assembly.

In accordance with a preferred embodiment of the present invention, a roughage feeder unit comprises an upright gate assembly, ground engaging means supporting the gate assembly for movement over the ground, and means coupled to the gate assembly for anchoring the gate assembly to the ground and adapted to restrict the gate assembly to movement over a predetermined distance relative to the ground. Preferably, the anchoring means is embodied as one or more anchors adapted to be secured to the ground in combination with motion limiting means for coupling the anchors to the gate assembly to allow limited movement of the gate assembly relative to the anchors.

More specifically, the roughage feeder unit comprises a gate, a pair of supports at opposite ends of the gate for supporting the gate in an upright position, and ground engaging means on each of the supports mounting the supports and gate for movement over the ground. In addition, the unit includes an anchor associated with each of the supports and adapted to be secured to the ground, and motion limiting means for connecting each of the anchors to its associated support to restrict the supports and gate for movement over a predetermined distance relative to the ground.

In a preferred embodiment, the motion limiting means comprises a telescoping brace mounted on each support and adapted to be secured to the associated anchor, e.g., a stake. Each brace comprises a pair of elongated telescoping members freely movable relative to each other and stop means on one of the telescoping members for limiting the relative movement of the telescoping members to restrict the gate to movement over a predetermined distance relative to the ground. A chain is secured to the stake and to one of the telescoping members of the associated brace for maintaining the stake in an upright position in the ground. Alternatively, the motion limiting means comprises a chain for connecting each stake to its associated support. A brace is secured to each stake for maintaining the stake in an upright position in the ground.

The present invention provides a roughage feeder unit for cattle or livestock which is conveniently transportable over the ground to facilitate its use at various locations. The feeder unit is also readily movable under pressure against the unit by the cattle or livestock. However, when it is desired to locate the unit adjacent to roughage, e.g., a haystack, the unit can be securely anchored to the ground to limit the amount of the haystack on which the cattle or livestock can feed. The anchoring arrangement allows only limited movement of the gate over the ground to limit the portion of the haystack on which the cattle or livestock can feed. In addition, the anchoring arrangement is designed to provide a secure connection to the ground and to minimize the possibility of disengagement of the anchoring connection by pressure against the unit by cattle or livestock.

The accompanying drawings illustrate a preferred embodiment of the invention and, together with the description, serve to explain the principles of the invention.

In the drawing:

FIG. 1 is a perspective view of a cattle roughage feeder unit constructed in accordance with the principles of the present invention including an upright gate, a pair of supports at opposite ends of the gate to support the gate for movement over the ground, and a pair of telescoping braces adapted to be secured to the ground to restrict the gate to movement over a predetermined distance relative to the ground;

Figure 1:
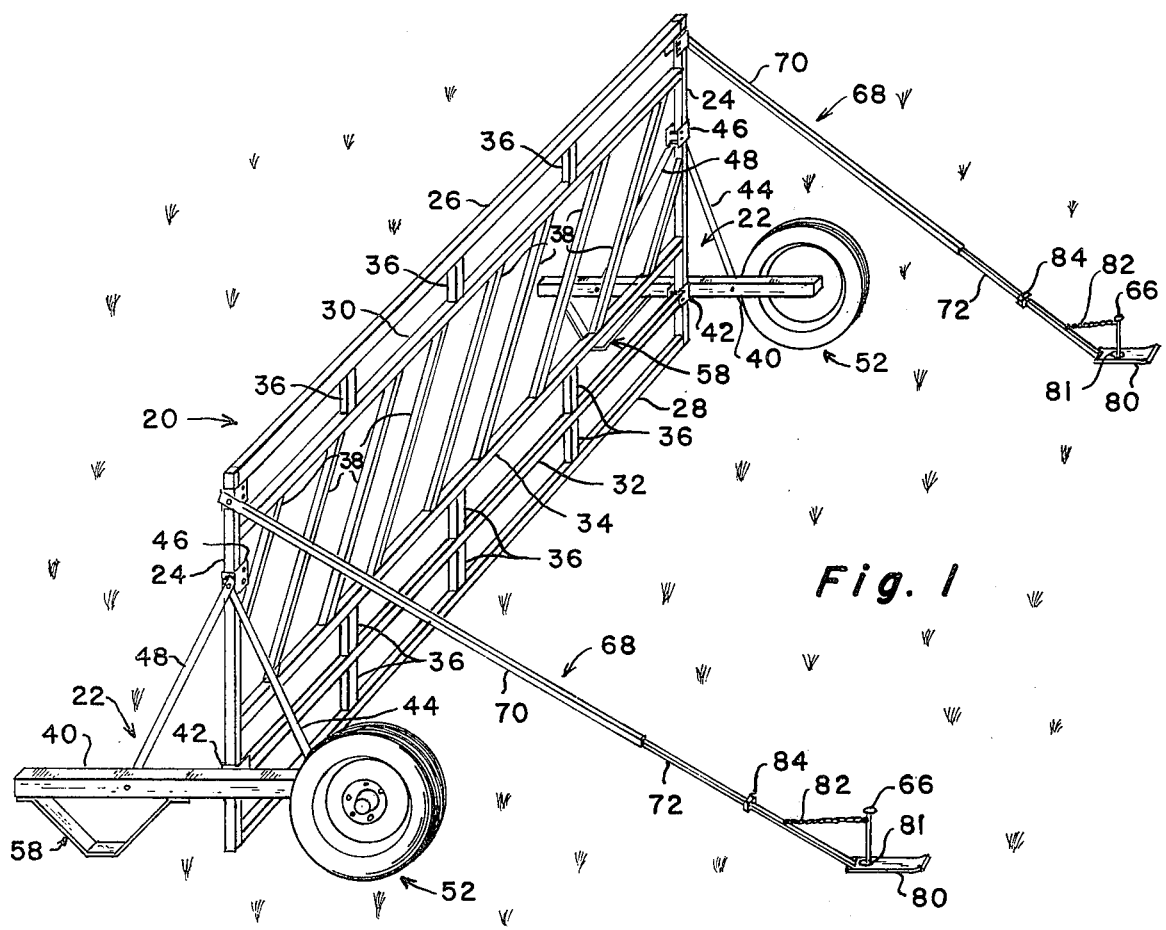

Referring to FIG. 1, a roughage feeder unit comprises an upright gate assembly including a gate 20 and a pair of supports 22 at opposite ends of gate 20 for supporting the gate in an upright position. Gate 20 comprises an elongated, rectangular frame including a pair of vertical end frame members 24 and elongated, horizontal upper and lower frame members 26 and 28. The frame includes additional elongated horizontal members, i.e., a horizontal frame member 30 adjacent to upper frame member 26 and horizontal frame members 32 and 34 adjacent to lower frame member 28. A plurality of vertical struts 36 are located between the horizontal frame members to strengthen the gate. In addition, the gate includes a plurality of diagonal frame members 38 connected to the frame in the space between vertical frame members 24 and horizontal frame members 30 and 34 to define a plurality of feeding stations. Preferably, the various frame members consist of high tensile steel tubing with a 2 inch square cross-section which are welded together.

Figure 2:
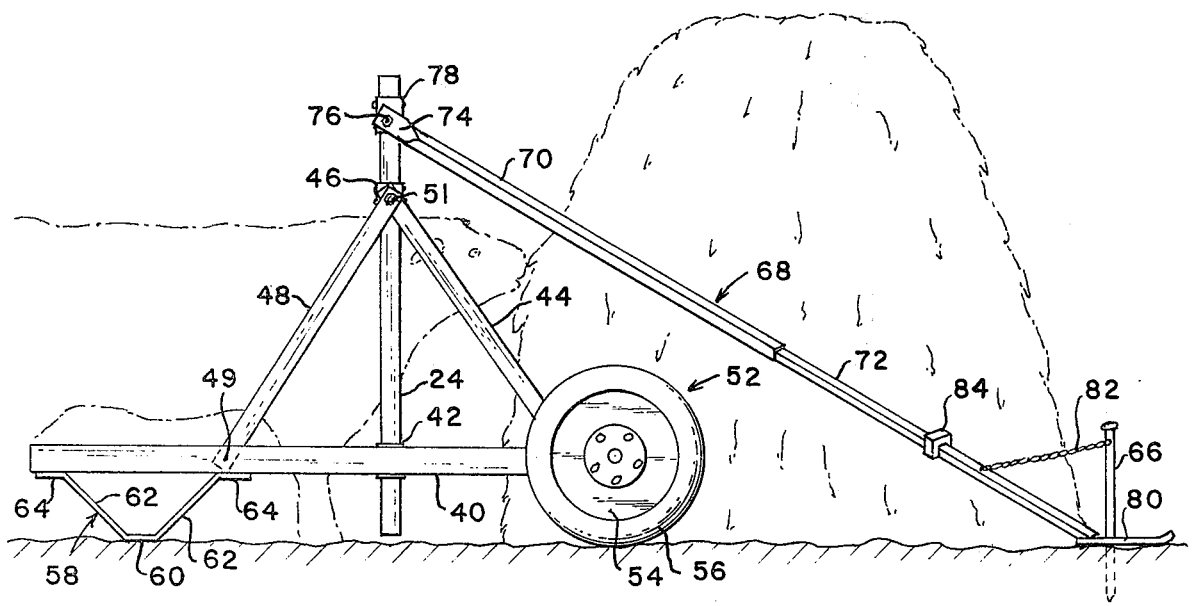
FIG. 2 is an enlarged side view of the support and telescoping brace at one end of the unit.
Figure 7:
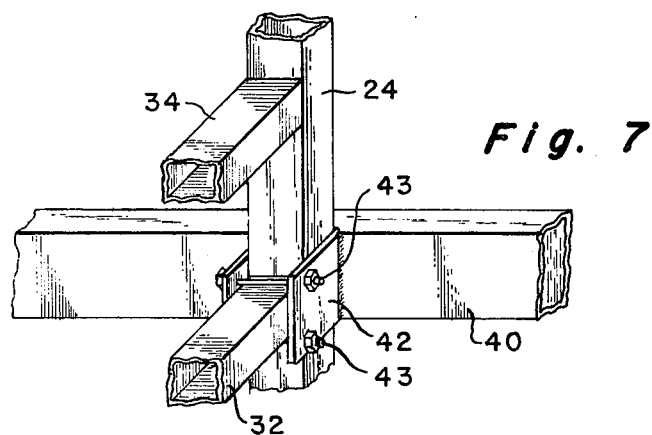
FIG. 7 is an enlarged perspective view of the lower portion at one end of the gate of FIG. 1 illustrating a clamp used to mount the gate on a horizontal member of the support.

As shown in FIG. 2, each support 22 comprises a horizontal support member 40 connected to gate 20 at a lower portion of vertical frame member 24. Preferably, horizontal support member 40 is secured to vertical frame member 24 by a clamp 42 (FIGS. 1 and 7). For example, as shown in FIG. 7, the clamp can be U-shaped and welded to horizontal support member 40. Clamp 42 includes a pair of nuts and bolts 43 to secure the clamp about vertical frame member 24 at the level of horizontal frame member 32. Alternatively, it is contemplated that other suitable connecting arrangements can be used in place of clamp 42.

Figure 6:
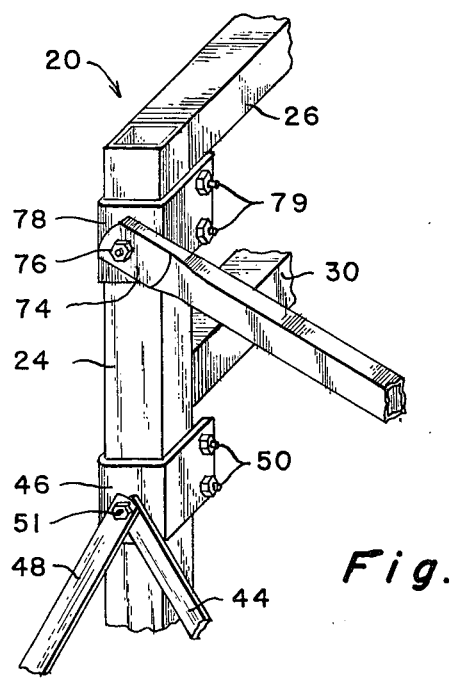
FIG. 6 is an enlarged perspective view of the upper portion at one end of the gate of FIG. 1 illustrating the connection of the telescoping brace and a pair of diagonal braces of the support to clamps provided on the gate.

Each support also includes one or more diagonal braces connected to its horizontal member and to an upper portion of the gate to support the gate in its upright position. As shown in FIGS. 1 and 2, a first diagonal brace 44 is connected to vertical frame member 24 by a clamp 46 and to a front portion of horizontal support member 40 by a bolt (not shown). In addition, a second diagonal brace 48 is also connected to vertical frame member 24 by clamp 46 and to a rear portion of horizontal support member 40 by an additional bolt 49. Referring to FIG. 6, clamp 46 is preferably U-shaped and provided with a pair of nuts and bolts 50 to secure it about vertical frame member 24. A bolt 51 welded to clamp 46 extends outwardly from the clamp to allow diagonal braces 44 and 48 to be secured to the clamp by a nut.

In accordance with the invention, ground engaging means is provided to support the gate assembly for movement over the ground. As embodied, the ground engaging means comprises a wheel 52 rotatably mounted at the front of each horizontal support member 40. Preferably, each wheel consists of a hub 54 which supports a pneumatic tire 56 which is at least the size of a conventional automobile tire.

In addition, the ground engaging means comprises a skid 58 mounted at the rear end of horizontal support member 40. Preferably, the skid comprises a V-shaped metal runner extending downward from support member 40 and including a lower, flat portion 60 at its apex for engaging the ground, a pair of diagonal legs 62 extending upwardly from flat portion 60 in opposite directions, and a pair of flanges 64 at the upper ends of diagonal legs 62 to allow the runner to be secured to horizontal support member 40, e.g., by bolts or welding. Flat portion 60 of runner 58 is dimensioned to provide a relatively small contact area with the ground. For example, it has been observed that a metal runner with a flat portion as little as 3 inches in length can be used.

The large size of wheels 52 and the minimal ground contact area of skids 58 permit the roughage feeder unit to be readily moved over the ground either manually or by pressure of cattle or other livestock against gate 20. The relatively large pneumatic tires provide flotation or buoyancy at the front ends of supports 22 to facilitate movement of the gate assembly in all weather conditions. Thus, the problem of resistance to movement as a result of driving the front ends of the skids of previous slidable gate units into the ground is completely eliminated. In addition, the unit can be readily transported to desired feeding locations even in inclement weather.

Further, in accordance with a preferred embodiment of the invention, the roughage feeder unit includes means coupled to the gate assembly for anchoring the gate assembly to the ground and adapted to restrict the gate assembly to movement over a predetermined distance relative to the ground. Preferably, the unit is provided with one or more anchors adapted to be secured to the ground and motion limiting means for coupling the anchors to the gate assembly to allow limited movement of the gate assembly relative to the anchors.

Referring to FIGS. 1 and 2, in the preferred embodiment of the roughage feeder unit, the anchors consist of a stake 66 associated with each support 22. The motion limiting means is embodied as a pair of telescoping braces 68 mounted on the supports and adapted to be anchored to the ground by the stakes. Each brace 68 comprises a pair of elongated telescoping members 70 and 72 freely movable relative to each other. For example, upper telescoping member 70 consists of steel tubing with a 2 inch square cross-section while lower telescoping member 72 consists of steel tubing with a 1½ inch square cross-section which is slidably received within upper telescoping member 70. Referring to FIG. 6, the upper end of telescoping member 70 is pressed flat to provide a flange 74 and a hole (not shown) is drilled in the flange for receiving a bolt 76 extending from a U-shaped clamp 78 secured about vertical frame member 24 by a pair of nuts and bolts 79 to provide a pivot connection between telescoping brace 68 and gate 20. The lower end of telescoping member 72 is provided with an enlarged foot comprising a plate 80 having a hole 81 for receiving stake 66. To maintain the stake in an upright position against pressure exerted on gate 20 by cattle or other livestock, a chain 82 is secured to the top of each stake and to telescoping member 72.

Further, the telescoping brace includes stop means on one of the telescoping members for limiting relative movement of the telescoping members to restrict the gate to movement over a predetermined distance relative to the ground. As shown in FIG. 2, a stop clamp 84 is provided on lower telescoping member 72 to limit the amount of movement available to the telescoping members. If desired, the position of stop clamp 84 can be adjustable to allow different amounts of telescoping movement to be selected.

When it is desired to place the roughage feeder unit in operation, the unit is moved to a position adjacent to one or more haystacks or large bales. For example, a row of haystacks or large bales can be arranged between a pair of parallel fences (not shown) and the roughage feeder unit arranged between the fences to restrict the access of cattle or livestock to the haystacks. Electric wires can be used to connect gate 20 to the fences to prevent the cattle or livestock from walking around the gate. Each telescoping brace 68 is expanded to its elongated configuration (FIG. 2) and its associated stake 66 is driven into the ground in front of the unit through the hole in the foot of each telescoping brace. Thereafter, as the cattle or livestock feed on the haystack through the feeding stations defined by diagonal frame members 38, the gate moves forward under pressure by the cattle or livestock to allow the cattle or livestock to feed on the haystack. However, when each telescoping brace 68 contracts to move the lower end of telescoping member 70 into contact with stop clamp 84, the forward movement of the roughage feeder unit is terminated. Each chain 82 prevents its stake 66 from tilting under pressure against gate 20 by the cattle or livestock and maintains the unit firmly anchored to the ground.

Since the telescoping braces limit the amount of movement of the unit to a predetermined distance over the ground, the cattle or livestock are restricted to feed on a limited portion of the haystack. Thus, the roughage feeder unit prevents overfeeding by the cattle or livestock. In addition, the gate avoids the previous waste associated with trampling of the roughage by the cattle or livestock. Further, by virtue of the movement of the feeder unit, the cattle or livestock are continuously able to move to new firm ground for feeding.

The diagonal orientation of frame members 38 prevent the cattle or livestock from easily moving through the gate to get a mouthful of hay and subsequently backing away from the gate and dropping the hay on the ground. To gain access to the hay on the other side of the gate, the cattle or livestock must turn their heads slightly to move through the gate to feed on the hay. The diagonal frame members encourage the cattle or livestock to remain in the feeder unit to consume each mouthful of hay. Thus, the diagonal members prevent unnecessary waste of the hay in the feeding of cattle or livestock.

Figure 3:
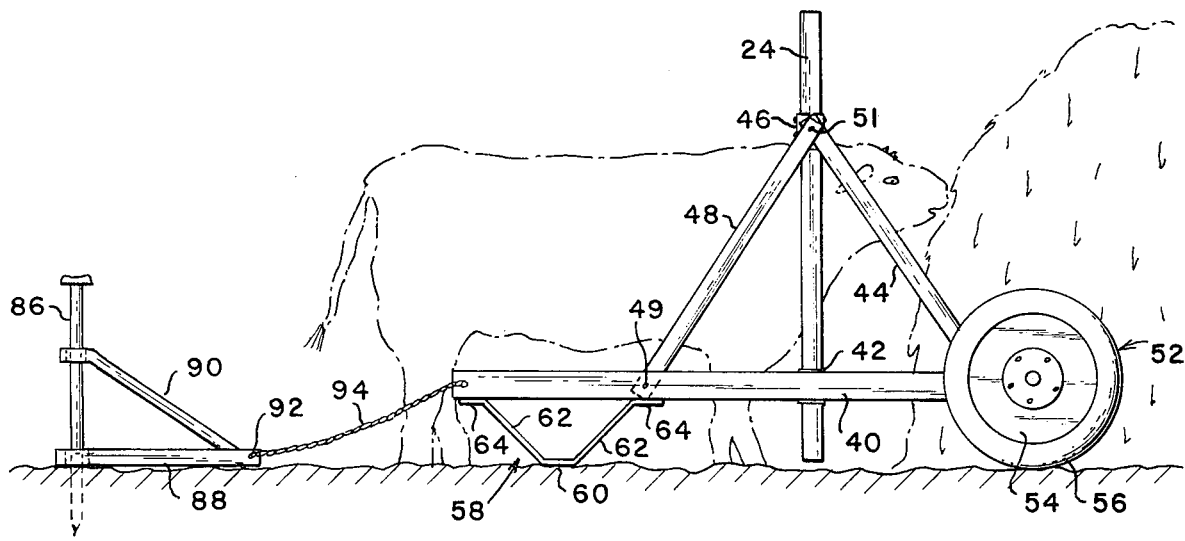
FIG. 3 is an enlarged side view of an alternative embodiment in which the support is connected by a chain to an anchor to be driven into the ground.

Referring to FIG. 3, an alternative embodiment of the roughage feeder unit includes an anchoring device comprising a stake 86, a horizontal member 88 having an opening for receiving the stake, and a diagonal brace 90 secured to the horizontal member by a pin 92 and also having an opening for receiving the stake. The purpose of brace 90 is to maintain stake 86 in an upright position under pressure against the feeder unit by cattle or livestock. A chain 94 is provided to connect horizontal member 88 to the rear end of horizontal support member 40.

When the roughage feeder unit is moved to a position adjacent a haystack, each stake 86 is driven into the ground at a position to the rear of the unit where chain 94 is slack. As the roughage feeder unit is moved forward under pressure from cattle or livestock, the slack in chain 94 is gradually taken up. When the chain becomes fully extended, the forward movement of the roughage feeder unit is terminated.

Figure 4:
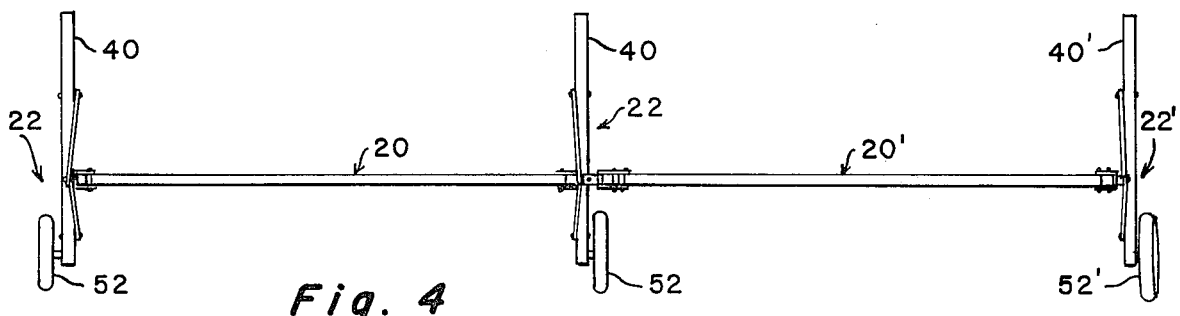
FIGS. 4 and 5 are plan and elevation views, respectively, of the roughage feeder unit without anchoring devices illustrating coupling devices to connect the unit to other similar units in side by side relation.
Figure 5:
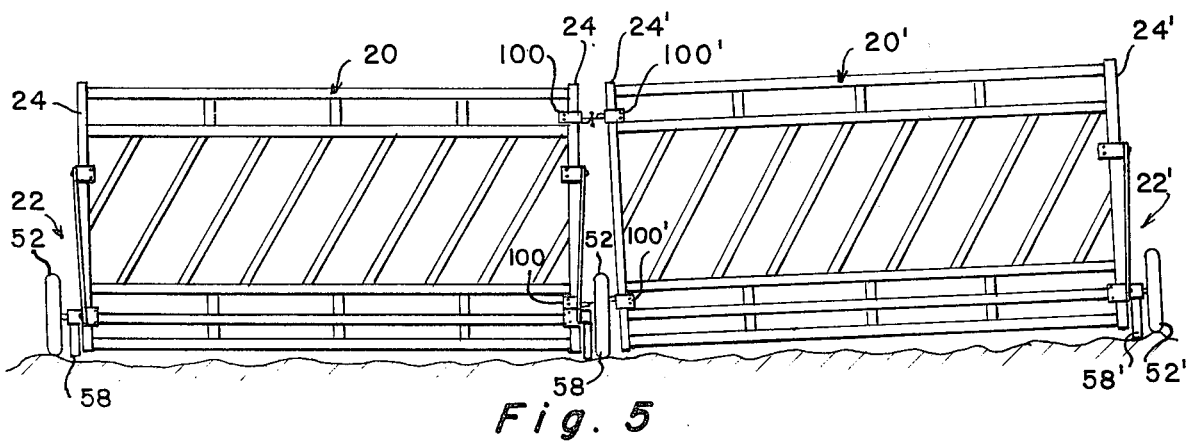
Figure 8:
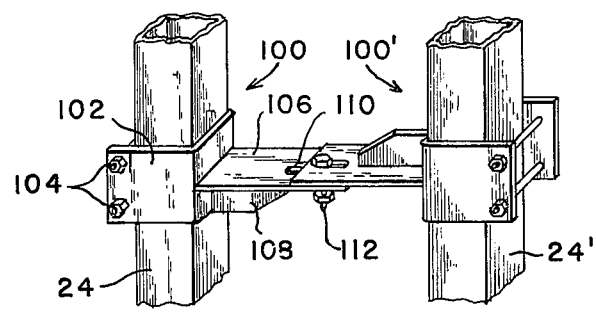
FIG. 8 is an enlarged perspective view of a set of coupling devices shown in FIG. 5 to connect the roughage feeder unit to another similar unit.

FIGS. 4 and 5 illustrate the possibility of providing add-on units to increase the feeding area available to cattle or livestock. It is contemplated that the add-on unit would consist of another gate 20' provided with a single support 22' at one of its ends. The other end of gate 20' would be secured to vertical frame member 24 of adjacent roughage feeder unit 20 by two sets of coupling devices 100 and 100' (FIG. 8).

Coupling device 100 comprises a U-shaped clamp 102 secured about vertical frame member 24 by a pair of nuts and bolts 104. A plate 106 welded to clamp 102 extends horizontally outward from the clamp. A reinforcing bridge 108 is welded to clamp 102 and plate 106. An elongated slot 110 is provided at the outer end of plate 106. Coupling device 100' is identical except that it is mounted on vertical frame member 24' of the adjacent unit upside down. A nut and bolt 112 is provided to join coupling devices 100 and 100' through the elongated slots. The bolt is not completely drawn tight but is provided with a self-locking burr to prevent the nut from working loose. As a result, the coupling devices allow some relative movement between the adjacent units to allow movement of the units over uneven ground as illustrated in FIG. 5.

The roughage feeder unit of the present invention provides a readily transportable gate assembly which can be conveniently moved to various areas to establish feeding stations for cattle or livestock. When installed for operation, the gate is movable by the cattle or livestock to allow gradual feeding on the roughage on the other side of the gate assembly. The anchoring devices of the roughage feeder unit restrict the access of the cattle or livestock to the roughage and prevent overfeeding and waste of the roughage.

The invention in its broader aspects is not limited to the specific details as shown and described, and modifications may be made in the details of the roughage feeder unit without departing from the principles of the present invention.

What is claimed is:

1. A roughage feeder unit adapted to be transported over the ground and placed adjacent to roughage to allow livestock to feed on the roughage, comprising:
   an upright gate assembly having a plurality of feeding stations for livestock;
   a pair of ground engaging wheels mounted at spaced locations forwardly on said gate assembly to facilitate forward movement of the feeder unit over the ground toward the roughage in response to pressure by the livestock against said gate assembly;
   a pair of ground engaging skids mounted at spaced locations rearwardly on said gate assembly and adapted to slide over the ground in response to pressure by the livestock against said gate assembly; and
   means coupled to said gate assembly for anchoring said gate assembly to the ground adjacent to the roughage and adapted to restrict said gate assembly to movement over a predetermined distance relative to the ground to allow the livestock to feed on a limited portion of the roughage.

2. The roughage feeder unit of claim 1, wherein said anchoring means comprises:
   one or more anchors adapted to be secured to the ground; and
   motion limiting means for coupling said anchors to said gate assembly to allow limited movement of said gate assembly relative to said anchors.

3. A roughage feeder unit adapted to be manually transported over the ground and anchored adjacent to roughage to allow livestock to move the unit forward and feed on the roughage, comprising:
   a gate having a plurality of feeding stations for livestock to feed on roughage located forwardly of said gate;
   a pair of supports at opposite ends of said gate for supporting said gate in an upright position, each of said supports having a front portion extending forwardly of said gate and a rear portion extending rearwardly of said gate;
   a ground engaging wheel mounted on said front portion of each of said supports to facilitate forward movement of the feeder unit over the ground toward the roughage in response to pressure by the livestock against said gate;
   a ground engaging skid mounted on said rear portion of each of said supports and adapted to slide over the ground in response to pressure by the livestock against said gate;
   a pair of anchors adapted to be secured to the ground; and
   motion limiting means for connecting each of said anchors to said gate to restrict said supports and gate to movement over a predetermined distance relative to the ground.

4. The roughage feeder unit of claim 3, wherein:
   each of said supports comprises a horizontal member connected to a lower portion of said gate and one or more diagonal braces connected to said horizontal member and to an upper portion of said gate to support said gate in its upright position.

5. The roughage feeder unit of claim 3, wherein:
   each anchor comprises a stake to be driven into the ground; and
   said motion limiting means comprises a pair of telescoping braces mounted at spaced locations on said gate and adapted to be secured to said stakes, each brace comprising a pair of elongated telescoping members freely movable relative to each other and stop means on one of said telescoping members for limiting the relative movement of said telescoping members to restrict said gate to movement over a predetermined distance relative to the ground.

6. The roughage feeder unit of claim 5, which includes:
   a chain secured to each stake and to one of said telescoping members of the associated brace for maintaining said stake in an upright position in the ground.

7. The roughage feeder unit of claim 3, wherein:
   each anchor comprises a stake to be driven into the ground; and
   said motion limiting means comprises a chain for connecting each stake to its associated support.

8. The roughage feeder unit of claim 7, which includes:
   a brace secured to each stake for maintaining said stake in an upright position in the ground.

9. A roughage feeder unit adapted to be manually transported over the ground and placed adjacent to roughage to allow livestock to move the unit forward to feed on the roughage, comprising:
   an upright gate assembly having a plurality of feeding stations for livestock to feed on roughage located forwardly of said gate;
   a pair of spaced horizontal supports extending forwardly and rearwardly of said gate assembly for supporting said gate assembly in an upright position;
   a ground engaging wheel mounted on each support forwardly of said gate assembly to permit said gate assembly to move forward over the ground in response to pressure by livestock against said gate assembly; and
   a ground engaging skid mounted on each support rearwardly of said gate assembly and adapted to slide over the ground in response to pressure by livestock against said gate assembly to allow the livestock to feed on the roughage.

10. The roughage feeder unit of claim 9, which includes:
    means coupled to said gate assembly for anchoring said gate assembly to the ground and adapted to restrict said gate assembly to movement over a predetermined distance relative to the ground.

11. The roughage feeder unit of claim 9, which includes:
    a set of coupling devices on said gate assembly for coupling said gate assembly in side-by-side relationship to another gate assembly.

12. The roughage feeder unit of claim 9, wherein:
    each of said supports comprises a horizontal member connected to a lower portion of said gate, said horizontal member having a first end extending forwardly and a second end extending rearwardly relative to said gate, and one or more diagonal braces connected to said horizontal member and to an upper portion of said gate to support said gate in its upright position; and said wheel is mounted at said first end of said horizontal member and said skid is mounted at said second end of said horizontal member.

13. The roughage feeder unit of claim 9, wherein each wheel includes a large pneumatic tire.

14. The roughage feeder unit of claim 9, wherein each skid comprises a V-shaped metal runner extending downward from each horizontal support member and having a small flat portion at its apex to contact the ground.

* * * * *